United States Patent
Shimizu

(10) Patent No.: US 9,278,766 B2
(45) Date of Patent: Mar. 8, 2016

(54) TRAJECTORY GENERATION DEVICE, TRAJECTORY GENERATION METHOD, AND STORAGE MEDIUM HAVING TRAJECTORY GENERATION PROGRAM STORED THEREIN

(71) Applicant: NEC Corporation, Minato-ku, Tokyo (JP)

(72) Inventor: Motoaki Shimizu, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 14/415,798

(22) PCT Filed: Mar. 26, 2013

(86) PCT No.: PCT/JP2013/002035
§ 371 (c)(1),
(2) Date: Jan. 20, 2015

(87) PCT Pub. No.: WO2014/016991
PCT Pub. Date: Jan. 30, 2014

(65) Prior Publication Data
US 2015/0197351 A1 Jul. 16, 2015

(30) Foreign Application Priority Data
Jul. 24, 2012 (JP) ................. 2012-163669

(51) Int. Cl.
*B64G 1/24* (2006.01)
*G05D 3/12* (2006.01)

(52) U.S. Cl.
CPC .......... *B64G 1/242* (2013.01); *B64G 2001/247* (2013.01)

(58) Field of Classification Search
CPC ............... B64G 1/24; G05D 3/12; G05D 1/12
USPC ................................... 701/13, 301
See application file for complete search history.

(56) References Cited

U.S. PATENT DOCUMENTS

| 9,044,860 B2* | 6/2015 | Takagi | B25J 9/1633 |
| 2011/0067936 A1* | 3/2011 | Takenaka | B62K 3/007 180/21 |

FOREIGN PATENT DOCUMENTS

| JP | 57-113112 A | 7/1982 |
| JP | 05-330498 A | 12/1993 |

(Continued)

OTHER PUBLICATIONS

International Search Report for PCT Application No. PCT/JP2013/002035, mailed on Apr. 23, 2013.

*Primary Examiner* — Tan Q Nguyen

(57) ABSTRACT

A trajectory generation device includes a control target (1), an angle detector (2), a command generator (5) and a trajectory generator (6). If a change is generated from a current target angle to a new target angle or if a change is generated from the current target angular velocity to a new target angular velocity in the command generator (5), a changed trajectory is regenerated by the trajectory generator (6) based on the angle up to the new target angle or the angular velocity up to the new target angular velocity, on the basis of the output angular velocity generated by the trajectory generator (6) at the point the change has occurred and on the basis of a current angle at the point the change has occurred or an output angle generated by the trajectory generator (6) at the point the change has occurred.

9 Claims, 7 Drawing Sheets

(56) References Cited

FOREIGN PATENT DOCUMENTS

| JP | 07-307703 A | 11/1995 |
| JP | 2001-330656 A | 11/2001 |
| JP | 2006-252081 A | 9/2006 |
| JP | 2006-8132 A | 12/2006 |
| JP | 2007-320528 A | 12/2007 |

* cited by examiner

TRAJECTORY GENERATION DEVICE, TRAJECTORY GENERATION METHOD, AND STORAGE MEDIUM HAVING TRAJECTORY GENERATION PROGRAM STORED THEREIN

This application is a National Stage Entry of PCT/JP2013/002035 filed on Mar. 26, 2013, which claims priority from Japanese Patent Application 2012-163669 filed on Jul. 24, 2012, the contents of all which are incorporated herein by reference, in their entirety.

TECHNICAL FIELD

The present invention relates to a trajectory generation device, a trajectory generation method, and a trajectory generation program and, particularly, to a trajectory generation device, a trajectory generation method, and a trajectory generation program which are capable of regenerating a trajectory accurately and in a short time even if a trajectory change occurs before reaching a target angle or a target angular velocity generated as a trajectory of a control target for tracking a moving target at the time of an optical space communication between mobile objects such as satellites or aircrafts or between the mobile object and a ground station. More specifically, the present invention relates to a trajectory generation device, a trajectory generation method, and a trajectory generation program which can avoid discontinuity of a trajectory by regenerating a trajectory from an output angular velocity predetermined as a trajectory at the time of occurrence of a trajectory change.

BACKGROUND ART

FIG. 7 is a block configuration diagram illustrating an inner configuration of a conventional trajectory generation device described in Japanese Unexamined Patent Application Publication No. 07-307703 of patent literature 1, "optical space communication equipment and mirror drive mechanism for optical space communication equipment". As shown in FIG. 7, the trajectory generation device described in patent literature 1 includes at least an angle detector 12 which detects an angle of a control target 11 as a current angle, a command generator 15 which sets a target angle and a target angular velocity of the control target 11 to track a target, and a trajectory generator 16 which generates a trajectory for tracking the target based on the current angle output from the angle detector 12 and the target angle and the angular velocity set by the command generator 15, and outputs the trajectory as a target command to a controller 13. The controller 13 generates a phase-compensated control signal of the control target 11 based on the target command output from the trajectory generator 16 and the current angle of the control target 11. Then, the controller 13 outputs the control signal to the control target 11 via a driver 14, so as to orient the control target 11 to the target angle and the target angular velocity ordered as the target command.

Consequently, by generating the trajectory by the trajectory generator 16 based on the target angle and the target angular velocity set by the command generator 15 and the current angle of the control target 11 which is the output of the angle detector 12 and outputting it as the target command to the controller 13, the control target 11 is controlled to be oriented to an instruction content of the target command. This control is a feedback control system using information of the current angle of the control target 11 as feedback information.

FIG. 8 is a diagram illustrating a time response according to the trajectory generated by the conventional trajectory generation device shown in FIG. 7. In FIG. 8, a horizontal axis represents the time, and a vertical axis represents the angular velocity. The trajectory generation method shown in FIG. 8 refers to as "a basic profile". Hereinafter, "the basic profile" shown in FIG. 8 will be described.

The trajectory generation command is given from the command generator 15 at the time $t=t_s$, and then the basic profile shall be generated. The target angular velocity being defined as $\omega_d$ and an acceleration duration time from an initial velocity '0' being defined as $t_\alpha$, a target angular acceleration $\alpha_d$ is given by a following formula (1).

[math 1]
$$\alpha_d = \frac{\omega_d}{t_\alpha} \tag{1}$$

Further, assuming that an accelerating time (an accelerating end time) is $t_1$, a constant velocity time (a constant velocity end time) is $t_2$, a decelerating time (a decelerating end time) is $t_3$, the target angle given as the trajectory generation command is $\theta_d$, an output angle of the trajectory generator 16 at the time t is $\theta_r$, an output angular velocity of the trajectory generator 16 at the time t is $\omega_r$, and the current angle output from the angle detector 12 at a trajectory generation start time $t_s$ (at the time of the trajectory generation) is $\theta_{ms}$, the accelerating time $t_1$, the constant velocity time $t_2$, and the decelerating time $t_3$ are respectively given by following formulas (2-1), (2-2) and (2-3).

[math 2]
$$t_1 = \frac{\omega_d}{\alpha_d} \tag{2-1}$$

$$t_2 = \frac{(\theta_d - \theta_{ms})}{\omega_d} - \frac{|\omega_d|}{|\alpha_d|} \tag{2-2}$$

$$t_3 = \frac{(\theta_d - \theta_{ms})}{\omega_d} \tag{2-3}$$

Further, output angular velocities $\omega_r$s in each of an accelerating period A11 (a period of $t_s \leq t < t_s+t_1$), a constant velocity period E11 (a period of $t_s+t_1 \leq t < t_s+t_2$), a decelerating period D11 (a period of $t_s+t_2 \leq t \leq t_s+t_3$), and a period after completion F11 which is after completion of trajectory generation (a period of $t > t_s+t_3$) are given by following formulas (3-1), (3-2), (3-3) and (3-4).
[math 3]

$$\omega_r = \alpha_d \times (t-t_s) \tag{3-1}$$

$$\omega_r = \omega_d \tag{3-2}$$

$$\omega_r = -\alpha \times (t-t_s-t_2) + \omega_d \tag{3-3}$$

$$\omega_r = 0 \tag{3-4}$$

Further, assuming that sampling frequency is $\Delta t$, the output angle $\theta_r$ of the trajectory generator 16 is given by a following formula (4).

[math 4]

$$\theta_r(t) = \theta_r(t-\Delta t) + \omega_r(t) \times \Delta t \tag{4}$$

Here, the output angle $\theta_r$ and the output angular velocity $\omega_r$ which is the output of the trajectory generator 16 are used as the target command to the controller 13.

CITATION LIST

Patent Literature

[Patent literature 1] Japanese Unexamined Patent Application Publication No. H7-307703 (pages 7 to 10)

SUMMARY OF INVENTION

Technical Problem

In the conventional technique described in the patent literature 1, when the target angle $\theta_d$ change occurs before the control target 11 reaches the target angle $\theta_d$ from the current angle $\theta_{ms}$ according to the basic profile, a trajectory modification is required. The problem in this case will be described with reference to FIGS. 9A and 9B. FIGS. 9A and 9B are illustrative diagrams illustrating the problem of the conventional trajectory generation device shown in FIG. 7. In FIG. 9A, a horizontal axis represents the time, and a vertical axis represents the target angle which is the output of the trajectory generator 16. In FIG. 9B, a horizontal axis represents the time, and a vertical axis represents the target angular velocity.

In FIG. 9A, a bold solid line 11 indicates the transition of the angle $\theta_r$ in a case where the trajectory is generated without regeneration of the trajectory on the way to reach the target angle A from the initial angle. In FIG. 9B, a bold solid line 13 indicates the transition of the angular velocity $\omega_r$ in a case where the trajectory is generated without regeneration of the trajectory on the way to reach the target angle A from the initial angle.

On the other hand, a dashed line 12 in FIG. 9A indicates the transition of the angle $\theta_r$ in a case where the trajectory is regenerated when the target angle is changed alternately between the target angle A and the target angle B each time the acceleration duration time $t_\alpha$ passes from the initial angle C. That is, in FIG. 9A, the target angle of the trajectory $O_1$, $O_3$ and $O_5$ is the target angle A, and the target angle of the trajectory $O_2$ and $O_4$ is the target angle B. As the transition of the angular velocity $\omega_r$ shown by the dashed line 14 in FIG. 9B, the angular velocity $\omega_r$ reaches the target angular velocity $\omega_d$ by the formula (3-1) each time the acceleration duration time $t_\alpha$ passes from the initial angle C. At the same time, the trajectory regeneration occurs so as to be $t=t_s$, and thus the angular velocity $\omega_r=0$ by the formula (3-1). Thus, as shown in FIGS. 9A and 9B, a point of discontinuity occurs each time the acceleration duration time $t_\alpha$ passes from the initial angle C. As compared to the bold solid lines 11 and 13 in FIGS. 9A and 9B, there is a problem that it takes a long time to reach the target angle A or the target angle B and the inadvertent vibration to the control target 11 is excited at the point of discontinuity as shown by the dashed lines 12 and 14.

(An Object of the Present Invention)

The present invention has been accomplished in consideration of the above problems and an object of the present invention is thus to provide a trajectory generation device, a trajectory generation method, and a trajectory generation program which are capable of generating the changed trajectory without generating the point of discontinuity of the angular velocity or the angle and reaching the target angle accurately and in a short time even if the trajectory change is required before the control target reaches the target angle.

Solution to Problem

To solve the above problems, a trajectory generation device, a trajectory generation method, and a trajectory generation program according to the present invention mainly adopt the following characteristic features.

(1)A trajectory generation device according to the present invention includes at least a control target, an angle detection means for outputting a current angle of the control target, a command generation means for setting a target angle and a target angular velocity of the control target, and a trajectory generation means for generating and outputting an output angular velocity and an output angle which give a trajectory of the control target based on the current angle, the target angle and the target angular velocity. If a change is generated from a current target angle to a new target angle or if a change is generated from the current target angular velocity to a new target angular velocity in the command generation means, a changed trajectory is regenerated by the trajectory generation means based on the angle up to the new target angle or the angular velocity up to the new target angular velocity, on the basis of the output angular velocity generated by the trajectory generation means at the point the change has occurred and on the basis of a current angle at the point the change has occurred or an output angle generated by the trajectory generation means at the point the change has occurred.

(2)A trajectory generation method according to the present invention includes at least an angle detection step for outputting a current angle of the control target, a command generation step for setting a target angle and a target angular velocity of the control target, and a trajectory generation step for generating and outputting an output angular velocity and an output angle which give a trajectory of the control target based on the current angle, the target angle and the target angular velocity. If a change is generated from a current target angle to a new target angle or if a change is generated from the current target angular velocity to a new target angular velocity in the command generation step, a changed trajectory is regenerated by the trajectory generation step based on the angle up to the new target angle or the angular velocity up to the new target angular velocity, on the basis of the output angular velocity generated by the trajectory generation step at the point the change has occurred and on the basis of a current angle at the point the change has occurred or an output angle generated by the trajectory generation step at the point the change has occurred.

(3)A trajectory generation program according to the present invention performs the trajectory generation method as a program capable of being executed by a computer.

Advantageous Effects of Invention

The trajectory generation device, the trajectory generation method, and the trajectory generation program according to the present invention can achieve the following effects.

That is, it is possible to regenerate a changed trajectory in a condition that the output angular velocity output from the trajectory generation means (the trajectory generation step) is maintained if the target angle or the target angular velocity is changed before the control target reaches the target angle and thus to regenerate a changed trajectory without generating the point of discontinuity and to definitely avoid a situation where an inadvertent vibration to the control target is excited.

Further, the regenerated changed trajectory is not only able to reach the target angle set in the command generation means (the command generation step) but also to satisfy the angular velocity set in the command generation means (the command generation step) at the constant velocity. In other words, it is possible to regenerate the trajectory of the constant angular velocity at the constant velocity consistently even if the target angle is changed many times while the target angular velocity maintains a constant angular velocity, and thus it is possible to achieve the implementation of the rate control in which the control target is controlled at the constant angular velocity and to attain the target angle.

DESCRIPTION OF EMBODIMENTS

Figure 1:
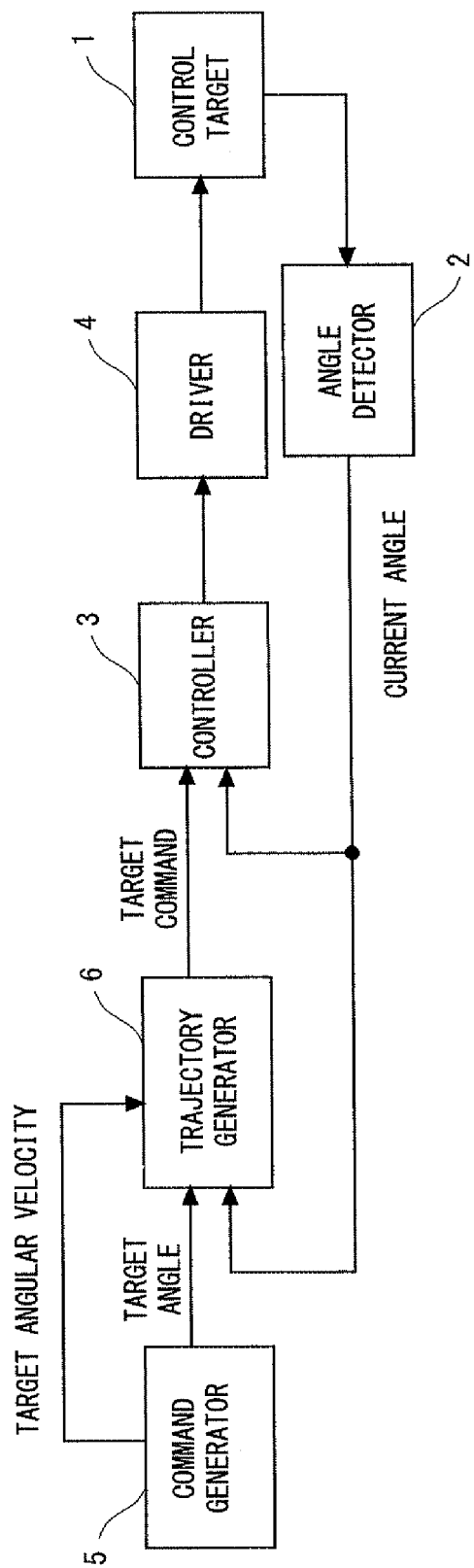
FIG. 1 is a block configuration diagram showing an example of an inner configuration of a trajectory generation device according to an exemplary embodiment of the present invention.

Hereinafter, with reference to the accompanying drawings, a preferred embodiment of a trajectory generation device, a trajectory generation method and a trajectory generation program according to the present invention will be described. In the following description, the trajectory generation device and the trajectory generation method according to the present invention will be described. It will be obvious that the trajectory generation method may be performed as the trajectory generated program capable of being executed by a computer or the trajectory generated program may be stored in a computer readable medium.

(Characteristics of the Present Invention)

Prior to giving a description of an exemplary embodiment of the present invention, a summary of characteristics of the present invention will be firstly described. The present invention includes at least a control target, an angle detection means for outputting a current angle of the control target, a command generation means for setting a target angle and a target angular velocity of the control target, and a trajectory generation means for generating and outputting an output angular velocity and an output angle which give a trajectory of the control target based on the current angle, the target angle and the target angular velocity. The present invention is mainly characterized in that if a change is generated from a current target angle to a new target angle or if a change is generated from the current target angular velocity to a new target angular velocity in the command generation means, a changed trajectory is regenerated by the trajectory generation means based on the angle up to the new target angle or the angular velocity up to the new target angular velocity, on the basis of the output angular velocity generated by the trajectory generation means at the point the change has occurred and on the basis of a current angle at the point the change has occurred or an output angle generated by the trajectory generation means at the point the change has occurred.

Thus, it is possible to change the trajectory without generating the point of discontinuity of the angular velocity or the angle in the trajectory in a condition that the output angular velocity generated by the trajectory generation means at the point the change is generated is maintained, and thus it is possible to definitely avoid a situation where an inadvertent vibration to the control target is excited and to bring the control target to the target angle in shorter time.

(An Exemplary Embodiment of the Present Invention)

Next, a configuration example of the embodiment of the trajectory generation device according to the present invention will be described. The trajectory generation device shown in FIG. 1 includes at least a control target 1 for tracking a target, an angle detector 2 which detects a current angle of the control target 1, a controller 3 which generates a control signal that controls the control target 1 based on a trajectory generated as a target command by a trajectory generator 6 and the current angle detected by the angle detector 2, a driver 4 which outputs the control signal generated by the controller 3 to the control target 1, a command generator 5 which sets a target angle and a target angular velocity to get the control target 1 to track the target, and a trajectory generator 6 which generates and outputs an output angular velocity and an output angle as a target command that gives the trajectory to the control target 1 for tracking a target based on the current angle generated by the angle detector 2 and the target angle and the angular velocity set by the command generator 5 as in the case of the conventional trajectory generation device shown in FIG. 7.

Figure 7:
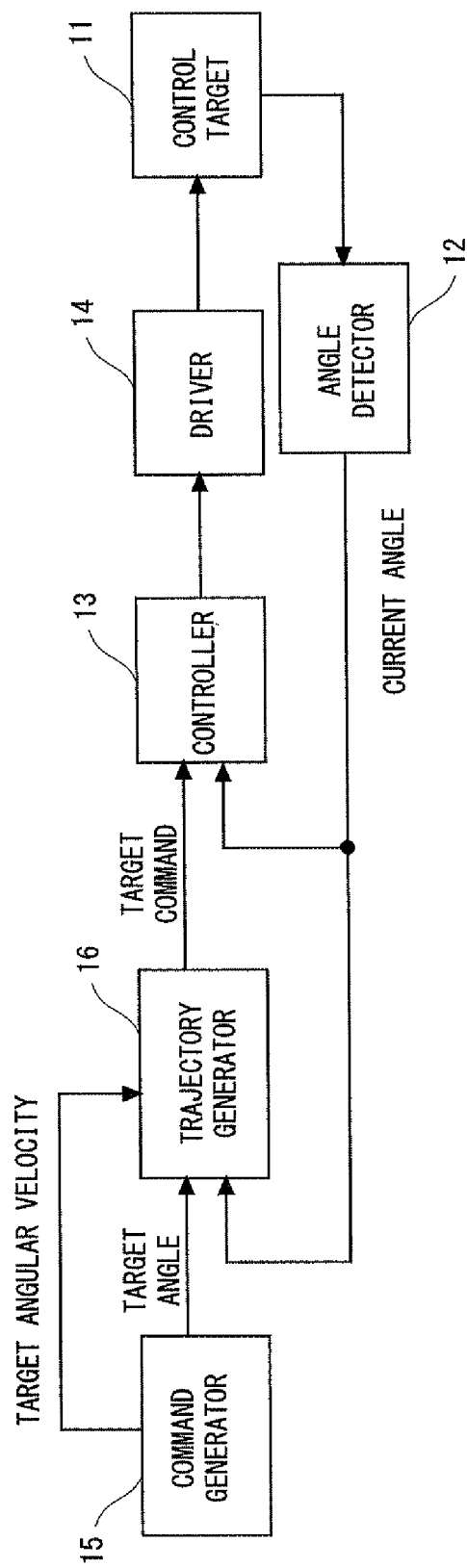
FIG. 7 is a block configuration diagram showing an inner configuration of a conventional trajectory generation device.
Figure 8:
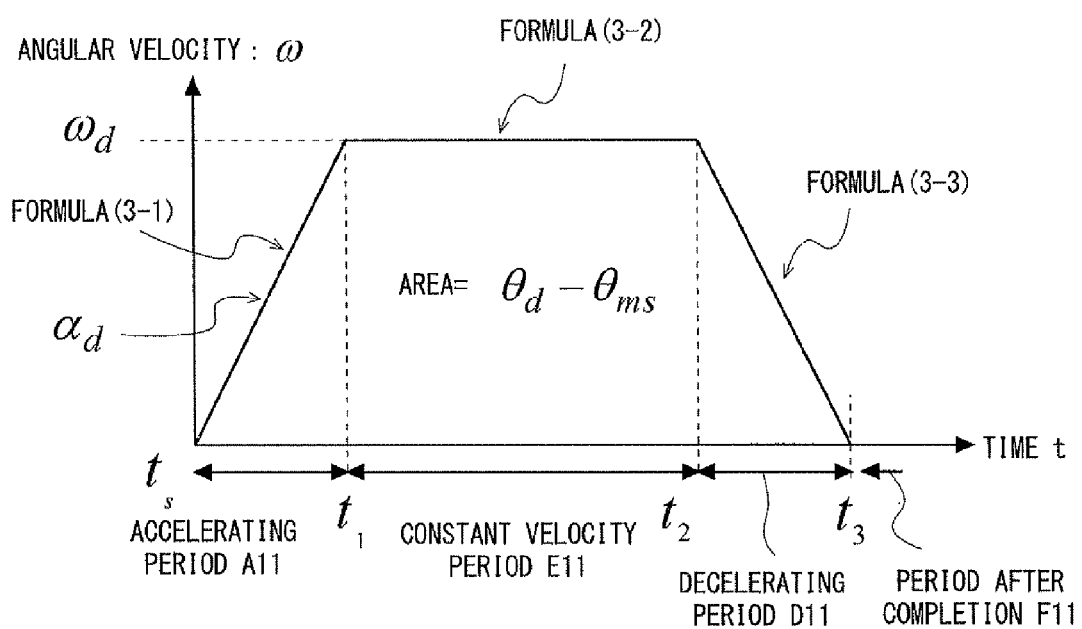
FIG. 8 is an illustrative diagram illustrating a time response according to the trajectory generated by the conventional trajectory generation device shown in FIG. 7.
Figure 9A:
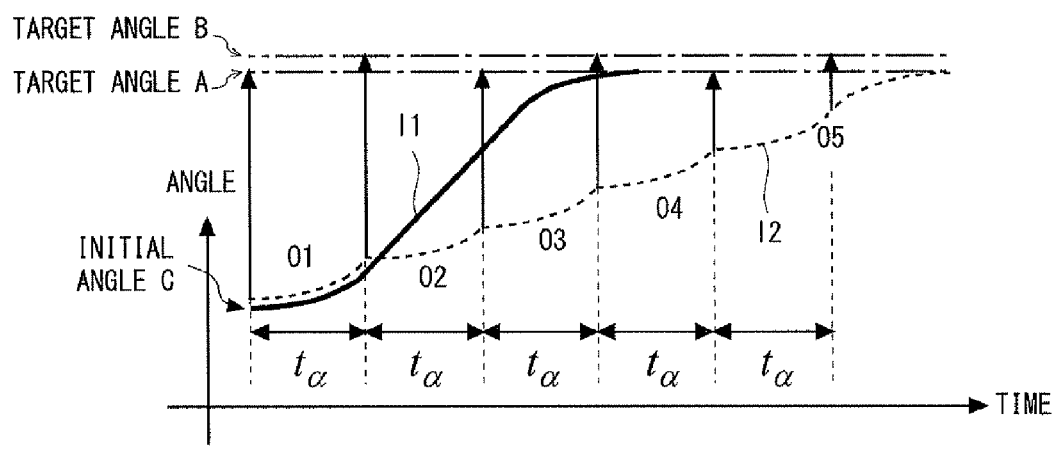
FIG. 9A is an illustrative diagram illustrating a problem of the conventional trajectory generation device shown in FIG. 7.
Figure 9B:
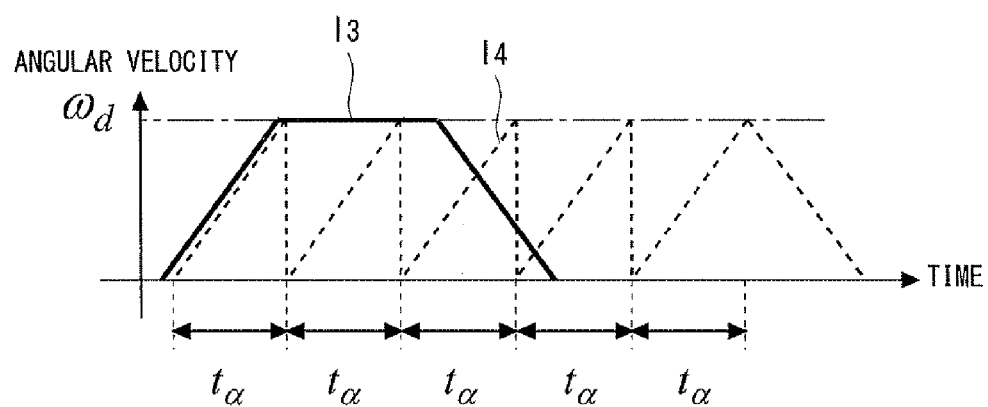
FIG. 9B is an illustrative diagram illustrating a problem of the conventional trajectory generation device shown in FIG. 7.

Here, in the trajectory generation device shown in FIG. 1, the controller 3 generates a phase-compensated control signal of the control target 1 based on the current angle output from the angle detector 2 and the target angle and the target angular velocity ordered by the command generator 5 and the control signal is output to the control target 1 via a driver 14 so as to orient the control target 1 to the target angle and the target angular velocity ordered by the command generator 5 as in the case of the conventional trajectory generation device shown in FIG. 7.

Consequently, by generating the trajectory by the trajectory generator 6 based on the target angle and the target angular velocity set by the command generator 5 and the current angle of the control target 1 which is the output of the angle detector 2 and outputting it as the target command to the controller 3, the control target 1 is controlled to be oriented to an instruction content of the target command. This control is a feedback control system using information of the current angle of the control target 1 as feedback information as in the case of the conventional trajectory generation device shown in FIG. 7. However, in the trajectory generation device shown in FIG. 1, in particular, functions of the trajectory generator 6 are greatly different from those of the trajectory generator 16 of the conventional trajectory generation device shown in FIG. 7.

Next, details about functions of the trajectory generator 6 of the trajectory generation device shown in FIG. 1 will be described. First, at the time $t=t_s$, if the trajectory generation command is given by the command generator 5 (i.e. if the trajectory generator 6 is notified about the change of either the target angle or the target angular velocity by the command generator 5 at the modification start time $t_s$), assuming that the target angle is $\theta_d$, the target angular velocity is $\omega_d$, the target angular velocity represented by positive number is $\omega_{dd}$ (>0), the target angular acceleration is $\alpha_d$, and (1) if the target angle $\theta_d$>=the output angle $\theta_{rs}$ of the trajectory generator 6, the target angular velocity $\omega_d$ and the target angular acceleration $\alpha_d$ is given by a following formula (5-1), (2) if the target angle $\theta_d$<the output angle $\theta_{rs}$ of the trajectory generator 6, the target angular velocity $\omega_d$ and the target angular acceleration $\alpha_d$ is given by a following formula (5-2).

[math 5]

$$\omega_d = \omega_{dd}, \alpha_d = \frac{\omega_d}{t_\alpha} \quad (5\text{-}1)$$

$$\omega_d = -\omega_{dd}, \alpha_d = \frac{\omega_d}{t_\alpha} \quad (5\text{-}2)$$

Where $t_\alpha$ represents the acceleration duration time from the initial velocity '0', and $\theta_{rs}$ represents the output angle of the trajectory generator 6 at the trajectory modification start time $t_s$ (when the trajectory is modified).

The trajectory generation patterns in the trajectory generator 6 according to the embodiment include four patterns of a trajectory generation pattern from acceleration, a trajectory generation pattern from constant velocity, a trajectory generation pattern from deceleration, and a trajectory generation pattern from stop, and are described below in turn. Note that any one of the four trajectory generation patterns is selected for use for regenerating the changed trajectory based on a result of comparing the output angular velocity $\omega_r$ of the trajectory generator 6 at the time of the change of the target angle $\theta_d$ or at the time that the target angular velocity $\omega_d$ occurs with the target angular velocity $\omega_d$ by a comparison means provided in the trajectory generator 6.

Here, an accelerating time (an accelerating end time) is set as $t_1$, a constant velocity time (a constant velocity end time) is set as $t_2$, and a decelerating time (a decelerating end time) is set as $t_3$. Further, the target angle is set as $\theta_d$, the target angular velocity is set as $\omega_d$, an output angle which is the output of the trajectory generator 6 at the time $t$ is set as $\theta_r$, and an output angular velocity which is the output of trajectory generator 6 at the time $t$ is $\omega_r$. Moreover, an output angle which is the output of the trajectory generator 6 at the trajectory modification start time $t_s$ (when the trajectory is modified) is set as $\theta_{rs}$, and an output angular velocity which is the output of the trajectory generator 6 at the trajectory modification start time $t_s$ (when the trajectory is modified) is $\omega_{rs}$.

Additionally, the current angle which is the output of the angle detector 2 is set as $\theta_m$. In the time which the relationship time t>(the trajectory modification start time $t_s$+the deceleration time $t_3$) is satisfied, if the trajectory modification command is given by the command generator 5, the output angle $\theta_{rs}$ of the trajectory generator 6 at the time (the trajectory modification start time $t_s$) is modified to the current angle $\theta_m$, and (the output angle $\theta_{rs}$ of the trajectory generator 6=the current angle $\theta_m$) is satisfied.

(1) The Trajectory Generation Pattern from Acceleration

Figure 2:
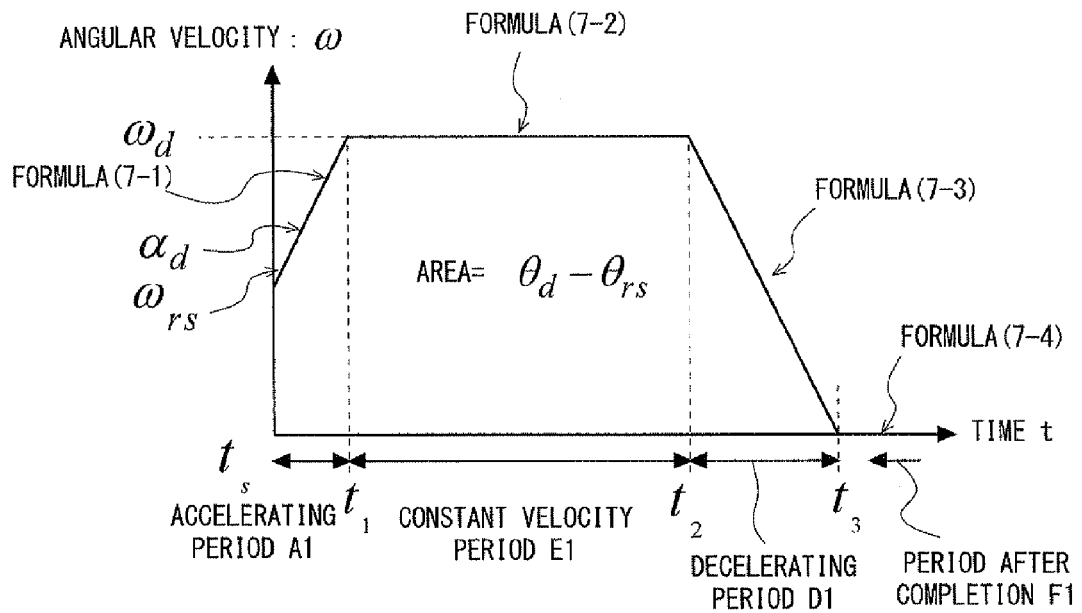
FIG. 2 is an illustrative diagram illustrating an example of a trajectory generation pattern from acceleration in a trajectory generator of the trajectory generation device shown in FIG. 1.

As shown in FIG. 2, when the trajectory is generated from acceleration, the accelerating time (an accelerating end time) $t_1$, the constant velocity time (a constant velocity end time) $t_2$, and the decelerating time (a decelerating end time) $t_3$ are respectively given by the following formulas (6-1), (6-2), and (6-3). Here, FIG. 2 is an illustrative diagram illustrating an example of a trajectory generation pattern from acceleration in the trajectory generator 6 of the trajectory generation device shown in FIG. 1

[math 6]

$$t_1 = \frac{(\omega_d - \omega_{rs})}{\alpha_d} \quad (6\text{-}1)$$

$$t_2 = \frac{(\theta_d - \theta_{rs})}{\omega_d} + \frac{(\omega_d - \omega_{rs})^2}{2|\alpha_d||\omega_d|} - \frac{|\omega_d|}{2|\alpha_d|} \quad (6\text{-}2)$$

$$t_3 = \frac{(\theta_d - \theta_{rs})}{\omega_d} + \frac{(\omega_d - \omega_{rs})^2}{2|\alpha_d||\omega_d|} + \frac{|\omega_d|}{2|\alpha_d|} \quad (6\text{-}3)$$

Further, output angular velocities $\omega_r$s in each of an accelerating period A1 (a period of $t_s$<=t<$t_s$+$t_1$), a constant velocity period E1 (a period of $t_s$+$t_1$<=t<$t_s$+$t_2$), a decelerating period D1 (a period of $t_s$+$t_2$<=t<=$t_s$+$t_3$), and a period after completion F1 which is after completion of trajectory generation (a period of t>$t_s$+$t_3$) are given by following formulas (7-1), (7-2), (7-3) and (7-4).

[math 7]

$$\omega_r = \omega_{rs} + \alpha_d \times (-t_s) \quad (7\text{-}1)$$

$$\omega_r = \omega_d \quad (7\text{-}2)$$

$$\omega_r = -\alpha_d \times (t - t_s - t_2) + \omega_d \quad (7\text{-}3)$$

$$\omega_r = 0 \quad (7\text{-}4)$$

That is, as shown in FIG. 2, the output angular velocity $\omega_r$ of the trajectory generator 6 is given by the formula (7-1) which accelerates at the target angular acceleration $\alpha_d$ in the accelerating period A1, by the formula (7-2) of constant angular velocity in the constant velocity period E1, by the formula (7-3) which decelerates at the target angular acceleration $\alpha_d$ in the decelerating period D1, and is '0' as shown in the formula (7-4) in the period after completion F1 which is after completion of trajectory generation.

Thus, an area surrounded by the change of the output angular velocity $\omega_r$ from the trajectory modification time $t_s$ to the deceleration time (a decelerating end time) $t_3$ is given by (the target angle $\theta_d$−the output angle $\theta_{rs}$ of the trajectory generator 6 at the trajectory modification time $t_s$) as shown in FIG. 2.

Further, assuming that the sampling frequency is $\Delta t$, the output angle $\theta_r$ which is the output of the trajectory generator 6 is given by the following formula (8).

[math 8]

$$\theta_r(t) = \theta_r(t - \Delta t) + \omega_r(t) \times \Delta t \quad (8)$$

(2) The Trajectory Generation Pattern from Constant Velocity

Figure 3:
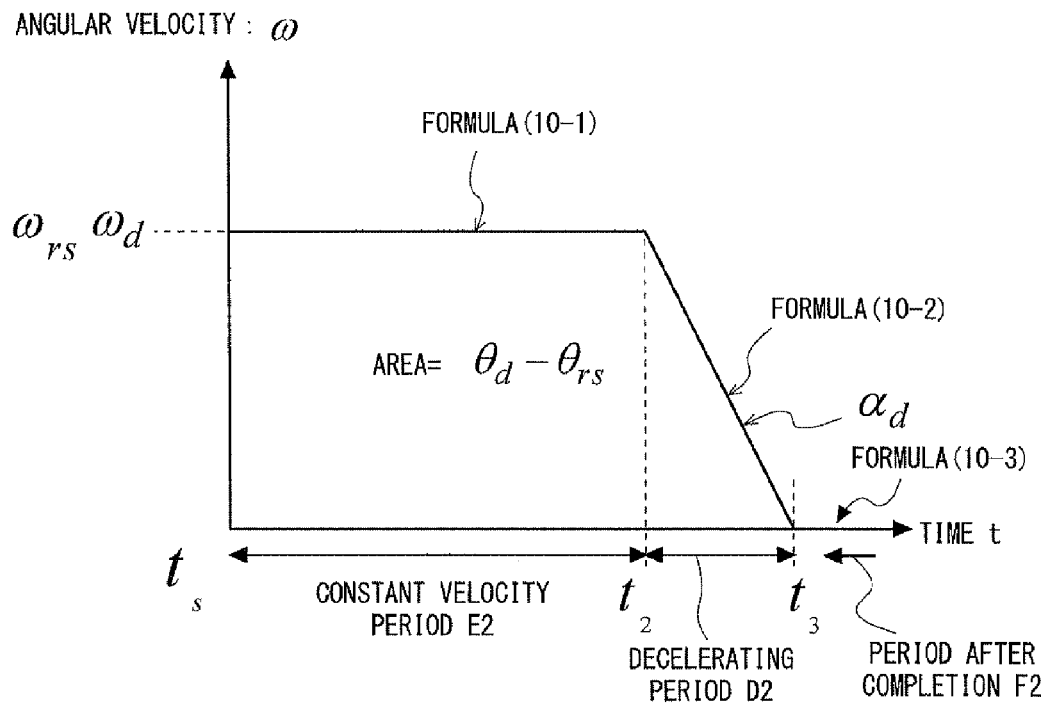
FIG. 3 is an illustrative diagram illustrating an example of a trajectory generation pattern from constant velocity in a trajectory generator of the trajectory generation device shown in FIG. 1.

As shown in FIG. 3, when the trajectory is generated from constant velocity, the accelerating time (an accelerating end time) $t_1$, the constant velocity time (a constant velocity end time) $t_2$, and the decelerating time (a decelerating end time) $t_3$ are respectively given by the following formulas (9-1), (9-2), and (9-3). Here, FIG. 3 is an illustrative diagram illustrating an example of a trajectory generation pattern from constant velocity in the trajectory generator 6 of the trajectory generation device shown in FIG. 1

[math 9]

$$t_1 = 0 \tag{9-1}$$

$$t_2 = \frac{(\theta_d - \theta_{rs})}{\omega_d} + \frac{(\omega_d - \omega_{rs})^2}{2|\alpha_d||\omega_d|} - \frac{|\omega_d|}{2|\alpha_d|} \tag{9-2}$$

$$t_3 = \frac{(\theta_d - \theta_{rs})}{\omega_d} + \frac{(\omega_d - \omega_{rs})^2}{2|\alpha_d||\omega_d|} + \frac{|\omega_d|}{2|\alpha_d|} \tag{9-3}$$

Further, output angular velocities $\omega_r$s in each of a constant velocity period E2 (a period of $t_s \leq t < t_s + t_2$), a decelerating period D2 (a period of $t_s + t_2 \leq t \leq t_s + t_3$), and a period after completion F2 which is after completion of trajectory generation (a period of $t > t_s + t_3$) are given by following formulas (10-1), (10-2) and (10-3).

[math 10]

$$\omega_r = \omega_d \tag{10-1}$$

$$\omega_r = -\alpha_{d\times}(t - t_s - t_2) + \omega_d \tag{10-2}$$

$$\omega_r = 0 \tag{10-3}$$

That is, as shown in FIG. 3, the output angular velocity $\omega_r$ of the trajectory generator 6 is given by the formula (10-1) of constant angular velocity in the constant velocity period E2, by the formula (10-2) which decelerates at the target angular acceleration $\alpha_d$ in the decelerating period D2, and is '0' as shown in the formula (10-3) in the period after completion F2 which is after completion of trajectory generation.

Thus, an area surrounded by the change of the output angular velocity $\omega_r$ from the trajectory modification time $t_s$ to the deceleration time (a decelerating end time) $t_3$ is, like the case shown in FIG. 2, given by (the target angle $\theta_d$–the output angle $\theta_{rs}$ of the trajectory generator 6 at the trajectory modification time $t_s$) as shown in FIG. 3.

Further, assuming that the sampling frequency is $\Delta t$, the output angle $\theta_r$ which is the output of the trajectory generator 6 is given by the following formula (11) which is the same as the formula (8).

[math 11]

$$\theta_r(t) = \theta_r(t - \Delta t) + \omega_r(t) \times \Delta t \tag{11}$$

(3) The Trajectory Generation Pattern from Deceleration

Figure 4:
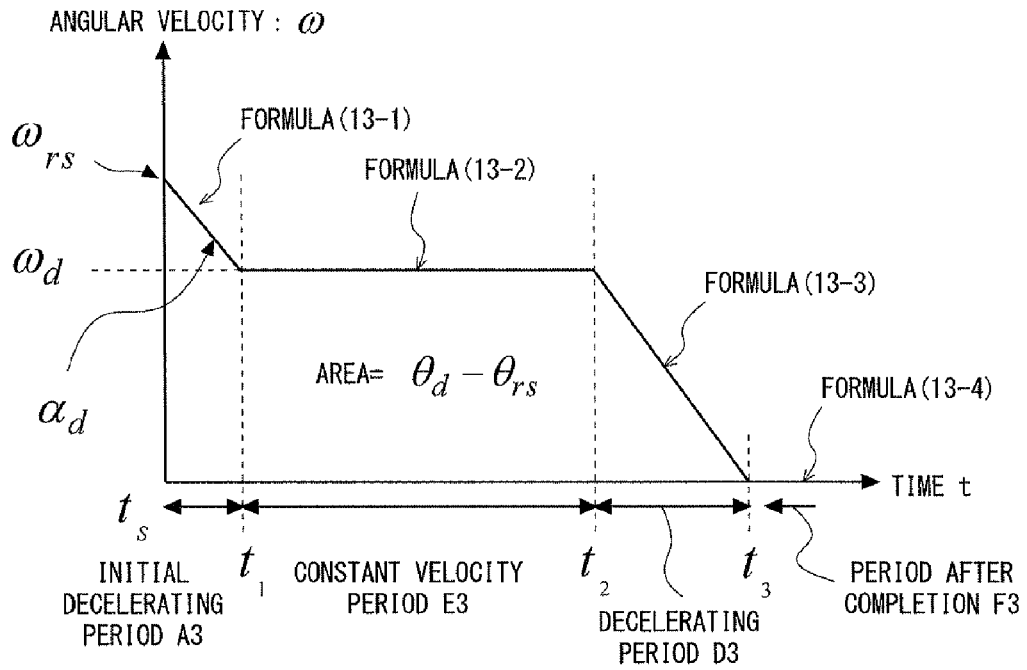
FIG. 4 is an illustrative diagram illustrating an example of a trajectory generation pattern from deceleration in a trajectory generator of the trajectory generation device shown in FIG. 1.

As shown in FIG. 4, when the trajectory is generated from deceleration, the accelerating time (an accelerating end time) $t_1$, the constant velocity time (a constant velocity end time) $t_2$, and the decelerating time (a decelerating end time) $t_3$ are respectively given by the following formulas (12-1), (12-2), and (12-3). Here, FIG. 4 is an illustrative diagram illustrating an example of a trajectory generation pattern from deceleration in the trajectory generator 6 of the trajectory generation device shown in FIG. 1

[math 12]

$$t_1 = \frac{(\omega_d - \omega_{rs})}{\alpha_d} \tag{12-1}$$

-continued $$t_2 = \frac{(\theta_d - \theta_{rs})}{\omega_d} + \frac{(\omega_d - \omega_{rs})^2}{2|\alpha_d||\omega_d|} - \frac{|\omega_d|}{2|\alpha_d|} \tag{12-2}$$

$$t_3 = \frac{(\theta_d - \theta_{rs})}{\omega_d} + \frac{(\omega_d - \omega_{rs})^2}{2|\alpha_d||\omega_d|} + \frac{|\omega_d|}{2|\alpha_d|} \tag{12-3}$$

Further, output angular velocities $\omega_{rs}$ of the trajectory generator 6 in each of an initial decelerating period A3 (a period of $t_s \leq t < t_s + t_1$), a constant velocity period E3 (a period of $t_s + t_1 \leq t < t_s + t_2$), a decelerating period D3 (a period of $t_s + t_2 \leq t \leq t_s + t_3$), and a period after completion F3 which is after completion of trajectory generation (a period of $t > t_s + t_3$) are given by following formulas (13-1), (13-2), (13-3) and (13-4).

[math 13]

$$\omega_r = \omega_{rs} - \alpha_d \times (t - t_s) \tag{13-1}$$

$$\omega_r = \omega_d \tag{13-2}$$

$$\omega_r = -\alpha_d \times (t - t_s - t_2) + \omega \text{hd } d \tag{13-3}$$

$$\omega_r = 0 \tag{13-4}$$

That is, as shown in FIG. 4, the output angular velocity $\omega_r$ of the trajectory generator 6 is given by the formula (13-1) which decelerates at the target angular acceleration $\alpha_d$ in the initial decelerating period A3, by the formula (13-2) of constant angular velocity in the constant velocity period E3, by the formula (13-3) which decelerates at the target angular acceleration $\alpha_d$ in the decelerating period D3, and is '0' as shown in the formula (13-4) in the period after completion F3 which is after completion of trajectory generation.

Thus, an area surrounded by the change of the output angular velocity $\omega_r$ from the trajectory modification time $t_s$ to the deceleration time (a decelerating end time) $t_3$ is. like the case shown in FIG. 2, given by (the target angle $\theta_d$–the output angle $\theta_{rs}$ of the trajectory generator 6 at the trajectory modification time $t_s$) as shown in FIG. 4.

Further, assuming that the sampling frequency is $\Delta t$, the output angle $\theta_r$ which is the output of the trajectory generator 6 is given by the following formula (14) which is the same as the formula (8).

[math 14]

$$\theta_r(t) = \theta_r(t - \Delta t) + \omega_r(t) \times \Delta t \tag{14}$$

(4) The Trajectory Generation Pattern from Stop

Figure 5:
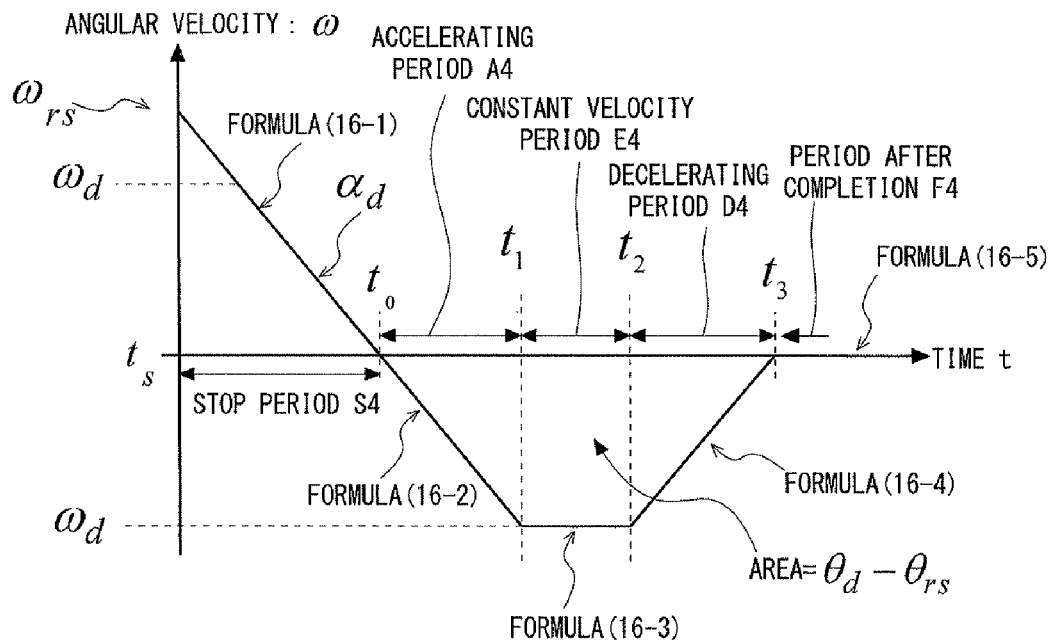
FIG. 5 is an illustrative diagram illustrating an example of a trajectory generation pattern from stop in a trajectory generator of the trajectory generation device shown in FIG. 1.

As shown in FIG. 5, assuming that a stop period (a stop end time) is $t_0$, when the trajectory is generated from stop, the stop period (the stop end time) $t_0$, the accelerating time (an accelerating end time) $t_1$, the constant velocity time (a constant velocity end time) $t_2$, and the decelerating time (a decelerating end time) $t_3$ are respectively given by the following formulas (15-1), (15-2), (15-3) and (15-4). Here, FIG. 5 is an illustrative diagram illustrating an example of a trajectory generation pattern from stop in the trajectory generator 6 of the trajectory generation device shown in FIG. 1

[math 15]

$$t_0 = \frac{\omega_{rs}}{\alpha_d} \tag{15-1}$$

$$t_1 = \frac{\omega_d}{\alpha_d} \tag{15-2}$$

-continued $$t_2 = \frac{(\theta_d - \theta_{rs})}{\omega_d} + \frac{\omega_{rs}^2}{2|\alpha_d||\omega_d|} \quad (15\text{-}3)$$

$$t_3 = \frac{(\theta_d - \theta_{rs})}{\omega_d} + \frac{\omega_{rs}^2}{2|\alpha_d||\omega_d|} + \frac{|\omega_d|}{|\alpha_d|} \quad (15\text{-}4)$$

Further, respective output angular velocities $\omega_{rs}$ of the trajectory generator 6 in each of a stop period S4 (a period of $t_s \leq t < t_s + t_0$), an accelerating period A4 (a period of $t_s + t_0 \leq t < t_s + t_1$), a constant velocity period E4 (a period of $t_s + t_1 \leq t < t_s + t_2$), a decelerating period D4 (a period of $t_s + t_2 \leq t \leq t_s + t_3$), and a period after completion F4 which is after completion of trajectory generation (a period of $t > t_s + t_3$) are given by following formulas (16-1), (16-2), (16-3), (16-4) and (16-5).
[math 16]

$$\omega_r = \omega_{rs} + \alpha_d \times (t - t_s) \quad (16\text{-}1)$$

$$\omega_r = \alpha_d \times (t - t_s - t_0) \quad (16\text{-}2)$$

$$\omega_r = \omega_d \quad (16\text{-}3)$$

$$\omega_r = -\alpha_d \times (t - t_s - t_0 - t_2) + \omega_d \quad (16\text{-}4)$$

$$\omega_r = 0 \quad (16\text{-}5)$$

That is, as shown in FIG. 5, the output angular velocity $\omega_r$ of the trajectory generator 6 is given by the formula (16-1) which decelerates at the target angular acceleration $\alpha_d$ in the stop period S4, by the formula (16-2) which accelerates at the target angular acceleration $\alpha_d$ in the accelerating period A4, by the formula (16-3) of the constant angular velocity in the constant velocity period E4, by the formula (16-4) which decelerates at the target angular acceleration $\alpha_d$ in the decelerating period D4, and is '0' as shown in the formula (16-5) in the period after completion F4 which is after completion of trajectory generation.

Thus, an area surrounded by the change of the output angular velocity $\omega_r$ from the trajectory modification time $t_s$ to the deceleration time (a decelerating end time) $t_3$ is, like the case shown in FIG. 2, given by (the target angle $\theta_d$ – the output angle $\theta_{rs}$ of the trajectory generator 6 at the trajectory modification time $t_s$) as shown in FIG. 4.

Further, assuming that the sampling frequency is $\Delta t$, the output angle $\theta_r$ which is the output of the trajectory generator 6 is given by the following formula (17) which is the same as the formula (8).
[math 17]

$$\theta_r(t) = \theta_r(t - \Delta t) + \omega_r(t) \times \Delta t \quad (17)$$

(Description of the Operation of the Embodiment)

Figure 6:
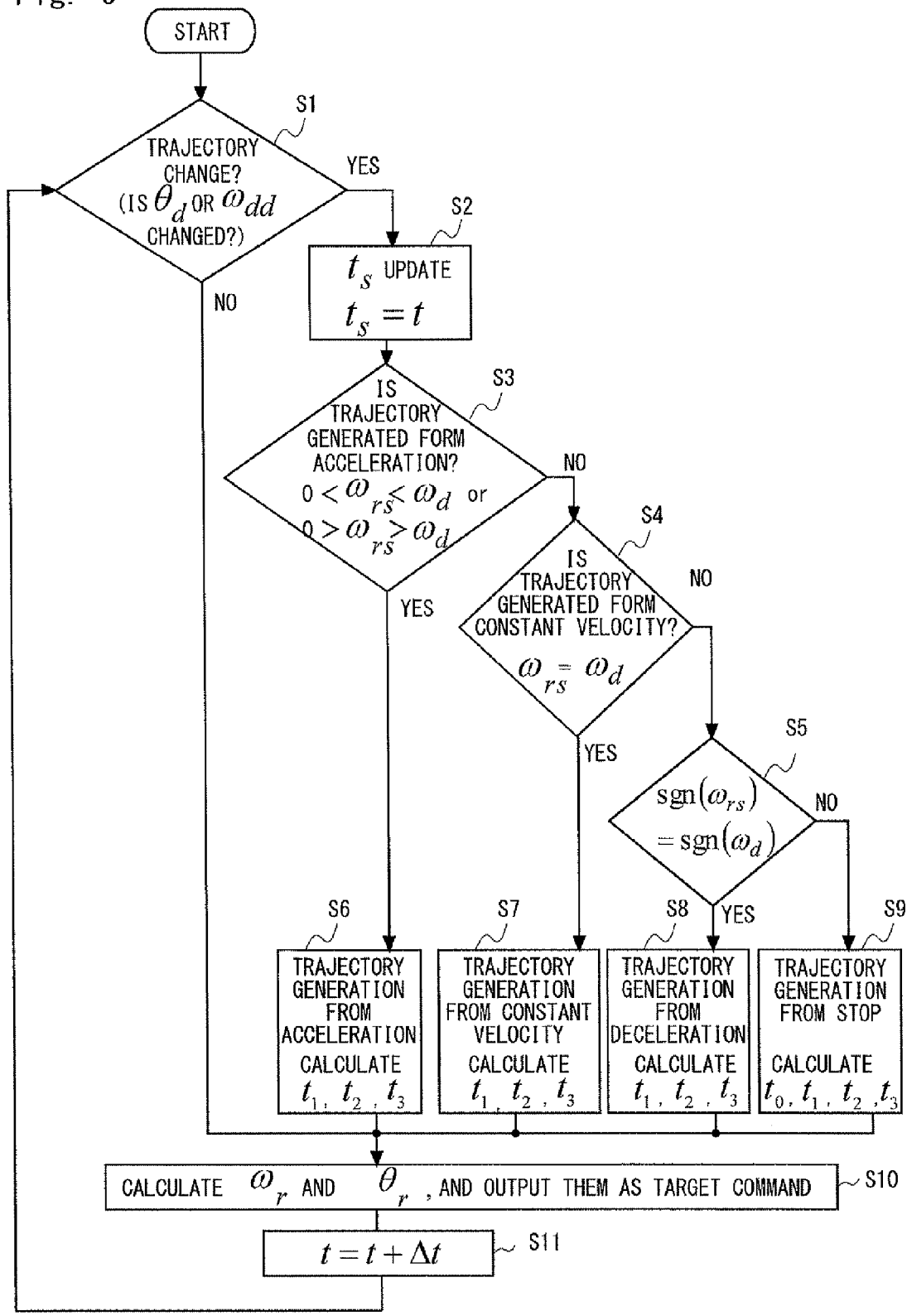
FIG. 6 is a flowchart illustrating an example of an operation of the trajectory generation device shown in FIGS. 1 to 5.

Next, with reference to FIG. 6, the operation of the trajectory generation device shown in FIGS. 1 to 5 as one embodiment of the present invention will be described. FIG. 6 is a flowchart illustrating an example of an operation of the trajectory generation device shown in FIGS. 1 to 5 and illustrates an example of the operation of switching the four trajectory generation patterns (i.e. the trajectory generation pattern from acceleration, the trajectory generation pattern from constant velocity, the trajectory generation pattern from deceleration, and the trajectory generation pattern from stop) described above.

First, in the flowchart of FIG. 6, the necessity of trajectory change, i.e. the presence or the absence of the change of the target angle $\theta_d$ or the target angular velocity $\omega_{dd}(>0)$ is determined (Step S1). In the command generator 5, when the target angle $\theta_d$ or the target angular velocity $\omega_{dd}$ is changed, i.e. the change has occurred from the current target angle $\theta_d$ to the new target angle or the change has occurred from the current target angular velocity $\omega_{dd}$ to the new target angular velocity, and the change of the trajectory is required (Step S1 YES), the trajectory modification start time $t_s$ is updated to the current time t by setting ts=t at the point the change occurred (Step S2).

Subsequently, it is determined whether or not the pattern regenerates the changed trajectory from acceleration firstly (Step S3). If the target angular velocity $\omega_d$ at the trajectory modification start time $t_s$ (the time of trajectory modification) at the point the change has occurred is larger than the output angular velocity o) of the trajectory generator 6 ($0 < \omega_{rs} < \omega_d$ or $0 > \omega_{rs} > \omega_d$) (Step S3 YES), it is determined that the pattern has regenerated the changed trajectory from acceleration. Since further acceleration is needed at the time of the trajectory generation, as described in the illustrative diagram of FIG. 2, the trajectory generation pattern from acceleration is selected and the accelerating time $t_1$, the constant velocity time $t_2$, and the decelerating time $t_3$ are respectively calculated using the above formulas (6-1), (6-2) and (6-3) (Step S6).

On the other hand, if the target angular velocity $\omega_d$ at the trajectory modification start time $t_s$ (the time of trajectory modification) at the point the change has occurred is not larger than the output angular velocity $\omega_{rs}$ of the trajectory generator 6 (Step 3 NO), it is determined that the regeneration of the changed trajectory from acceleration is not required. Then, it is determined whether or not the pattern regenerates the changed trajectory from constant velocity (Step S4). If the target angular velocity $\omega_d$ at the trajectory modification start time $t_s$ (the time of trajectory modification) at the point the change has occurred is equal to the output angular velocity $\omega_{rs}$ of the trajectory generator 6 ($\omega_{rs} = \omega_d$) (Step S4 YES), it is determined that the pattern has regenerated the changed trajectory from constant velocity. As described in the illustrative diagram of FIG. 3, the trajectory generation pattern from constant velocity is selected and the accelerating time $t_1$, the constant velocity time $t_2$, and the decelerating time $t_3$ are respectively calculated using the above formulas (9-1), (9-2) and (9-3) (Step S7).

Alternatively, if the target angular velocity $\omega_d$ at the trajectory modification start time $t_s$ (the time of trajectory modification) at the point the change has occurred is not equal to the output angular velocity $\omega_{rs}$ of the trajectory generator 6 (Step S4 NO), it is determined that the regeneration of the changed trajectory from constant velocity is not required. Then, it is determined whether or not the pattern has regenerated the changed trajectory from deceleration (Step S5). The sign (sgn) of the target angular velocity $\omega_d$ at the trajectory modification start time $t_s$ (the time of trajectory modification) at the point the change has occurred is compared to that of the output angular velocity $\omega_{rs}$ of the trajectory generator 6, and if these signs (sgn) are coincident with each other (Step S5 YES), it is determined that the pattern has regenerates the changed trajectory from deceleration. As described in the illustrative diagram of FIG. 4, the trajectory generation pattern from deceleration is selected and the accelerating time $t_1$, the constant velocity time $t_2$, and the decelerating time $t_3$ are respectively calculated using the above formulas (12-1), (12-2) and (12-3) (Step S8).

Further, if the sign (sgn) of the target angular velocity $\omega_d$ at the trajectory modification start time $t_s$ (the time of trajectory modification) at the point the change has occurred is not coincident with that of the output angular velocity $\omega_{rs}$ of the trajectory generator 6 (Step 5 NO), it is determined that the regeneration of the changed trajectory from stop has been performed. The stop time $t_0$, the accelerating time $t_1$, the constant velocity time $t_2$, and the decelerating time $t_3$ are respectively calculated using the formulas (15-1), (15-2), (15-3) and (15-4) (Step S9).

Then, in Step S1, if the target angle $\theta_d$ or the target angular velocity $\omega_{dd}$ is not changed, and the regeneration of the changed trajectory is not required (Step S1 NO), or the respective calculation processes of times in each of steps S6, S7 S8 and S9 in which the regeneration is required are finished, the operation is transferred to Step S10. In the Step S10, if the regeneration of the changed trajectory is not required, the trajectory generator 6 outputs the same output angular velocity $\omega_r$ and the same output angle $\theta_r$ as the target command (Step S10).

On the contrary, if the regeneration of the changed trajectory is required, in order to regenerate the changed trajectory for the angle to the new target angle or the angular velocity to the new target angular velocity, the trajectory generator 6 calculates the output angular velocity $\omega_r$ of the trajectory generator 6 at a given time t after the trajectory modification start time $t_s$ (the trajectory modification time) at the point the change has occurred and the output angle $\theta_r$ of the trajectory generator 6 at the time t based on the output angular velocity $\omega_{rs}$ generated by the trajectory generator 6 at the point the change has occurred and the current angle of the control target 1 at the point the change has occurred or the output angle $\theta_{rs}$ generated by the trajectory generator 6 at the point the change has occurred using any one group of formulas (7-1), (7-2), (7-3), (7-4), and (8), or (10-1), (10-2), (10-3) and (11), or (13-1), (13-2), (13-3), (13-4) and (14), or (16-1), (16-2), (16-3), (16-4), (16-5) and (17) appropriate to each case and output them to the controller 3 as the target command.

That is, in Step S10, with respect to the four trajectory generation patterns, the following operation is performed. When the trajectory generation pattern from acceleration is executed in Step S6, the output angular velocity $\omega_r$ of the trajectory generator 6 at the time t for each of the accelerating period A1, the constant velocity period E1, the decelerating period D1, and the period after completion F1 are calculated respectively based on the formulas (7-1), (7-2), (7-3) or (7-4) and the output angle $\theta_r$ of the trajectory generator 6 at the time t is calculated based on the formula (8) until the next trajectory change is required in Step S1.

Further, when the trajectory generation pattern from constant velocity is executed in Step S7, the output angular velocity $\omega_r$ of the trajectory generator 6 at the time t for each of the constant velocity period E2, the decelerating period D2, and the period after completion F2 is calculated respectively based on the formulas (10-1), (10-2), or (10-3) and the output angle $\theta_r$ of the trajectory generator 6 at the time t is calculated based on the formula (11) until the next trajectory change is required in Step S1.

Further, when the trajectory generation pattern from deceleration is executed in Step S8, the output angular velocity $\omega_r$ of the trajectory generator 6 at the time t for each of the initial decelerating period A3, the constant velocity period E3, the decelerating period D3, and the period after completion F3 is calculated respectively based on the formulas (13-1), (13-2), (13-3) or (13-4) and the output angle $\theta_r$ of the trajectory generator 6 at the time t is calculated based on the formula (14) until the next trajectory change is required in Step S1.

Further, when the trajectory generation pattern from stop is executed in Step S9, the output angular velocity $\omega_r$ of the trajectory generator 6 at the time t for each of the stop period S4, the acceleration period A4, the constant velocity period E4, the decelerating period D4, and the period after completion F4 is calculated respectively based on the formulas (16-1), (16-2), (16-3), (16-4) or (16-5) and the output angle $\theta_r$ of the trajectory generator 6 at the time t is calculated based on the formula (17) until the next trajectory change is required in Step S1.

As a result, the changed trajectory regenerated in the trajectory generator 6 can be generated as the trajectory which satisfies the target angular velocity $\omega_d$ set in the command generator 5 at the time of the constant velocity or the new target angular velocity $\omega_d$ newly set.

After the completion of the calculation of Step S10, then the current time t is updated with the sampling frequency $\Delta t$ so as to satisfy the formula $t=t+\Delta t$. At the time to transit to the next sampling frequency, the operation returns to step S1 (Step S11).

Also, the respective comparison processes of steps S3, S4 and S5 each provide a comparison step (or a comparison means) for comparing the output angular velocity $\omega_{rs}$ of the trajectory generator 6 at the time the change has occurred with the target angular velocity $\omega_d$ in order to select from among the four trajectory generation patterns for the trajectory pattern of the changed trajectory to be regenerated. Further, the target angular velocity used for determining necessity of the trajectory change in step S1 is not limited to a positive number of $\omega_{dd}(>0)$. The target angular velocity $\omega_d$ including both positive and negative number can definitely be used for determining this necessity.

In the trajectory generation device or the trajectory generation method according to the embodiment that operates as described above, it is possible to regenerate the trajectory in a condition that the output angular velocity $\omega_r$ of trajectory generator 6 is maintained even if the target angle $\theta_d$ or the target angular velocity $\omega_r$ is changed before the control target 1 reaches the target angle by selecting and using one of the four trajectory generation patterns such as the trajectory generation pattern from acceleration, the trajectory generation pattern from constant velocity, the trajectory generation pattern from deceleration, and the trajectory generation pattern from stop. Thus, it is possible to regenerate a changed trajectory without generating the point of discontinuity and to definitely avoid a situation where an inadvertent vibration to the control target 1 is excited.

Further, in the trajectory generation device or the trajectory generation method of the embodiment, it is possible to regenerate the trajectory in a condition that the output angular velocity $\omega_r$ of trajectory generator 6 is maintained even if the target angle $\theta_d$ or the target angular velocity $\omega_r$ is changed before the control target 1 reaches the target angle by selecting and using one of the four trajectory generation patterns such as the trajectory generation pattern from constant velocity, the trajectory generation pattern from deceleration, and the trajectory generation pattern from stop. Thus, it is possible to shorten the time until the control target 1 reaches the target angle $\theta_d$.

Further, it is possible to make the regenerated changed trajectory into not only a trajectory which can reach the target angle $\theta_d$ set by the command generator 5 but also a trajectory which satisfies the target angular velocity $\omega_d$ set in the command generator 5 at the constant velocity or the new target angular velocity $\omega_d$ newly set. In other words, it is possible to regenerate the trajectory of the constant angular velocity at the constant velocity consistently even if the target angle $\theta_d$ is changed many times while the target angular velocity is maintained, and thus it is possible to achieve the implementation of the rate control in which the control target 1 is controlled at the constant angular velocity and to attain the target angle $\theta_d$.

The description of the embodiment described above was made on the condition that a rotation axis is a single axis. The present invention, however, is not limited to the single axis. It is possible to apply the trajectory generation device or the trajectory generation method according to the present invention even if a plurality of axis exist by getting each axis perform the same operation as the operation of the embodiment described above independently.

The description of the embodiment described above was made on the condition that the control target 1 is a rotating control target. The present invention, however, is not limited to the control target 1 being the rotating control target as just described. The control target 1, for example, may instead be a translating control target. In this case, it is possible to apply the trajectory generation device or the trajectory generation method according to the present invention by changing the angle described above to a position, and the angular velocity to a velocity.

The description of the embodiment described above was made on the condition of the angle feedback control system as the feedback control system in which the information of the current angle of the control target 1 is fed back. The present invention, however, is not limited to the angle feedback control system. Needless to say, it is possible to apply the trajectory generation device or the trajectory generation method according to the present invention to any control system if the control system can detect the angle and uses the angle or the angular velocity as the target command.

(Description of Effects of the Embodiment)

As described above, the following effects can be achieved in the embodiment.

That is, when the target angle or the target angular velocity is changed before the control target 1 reaches the target angle, it is possible to regenerate the changed trajectory while the output angular velocity output from the trajectory generator 6 is maintained. Therefore, it is possible to regenerate the changed trajectory without generating the point of discontinuity of the angular velocity or the angle in the trajectory and to definitely avoid a situation where an inadvertent vibration to the control target 1 is excited.

Further, the regenerated changed trajectory can not only reach the target angle set by the command generator 5 but also satisfy the target angular velocity set by the command generator 5 at the constant velocity. In other words, it is possible to regenerate the trajectory of the constant angular velocity at the constant velocity consistently even if the target angle is changed many times while the target angular velocity is maintained, and thus it is possible to achieve the implementation of the rate control in which the control target 1 is controlled at the constant angular velocity and to attain the target angle.

Further, in the embodiment, the following effects can be achieved compared to those of the related art. In the related art such as Japanese Unexamined Patent Application Publication No. 2006-252081 "Belt-positioning device" or Japanese Unexamined Patent Application Publication No. 2007-320528 "Attitude control device of artificial satellite", the case that the change of the target angle from the old angle to the new angle occurs in the process of tracking by the old velocity profile (acceleration, constant velocity, or deceleration) generated based on the old target angle, such as the case that the target angle or the target angular velocity is changed before the control target 1 reaches the target angle, is not assumed. The new velocity profile (acceleration, constant velocity, or deceleration) for the changed new target angle should be generated after it has reached the old target angle by acceleration, constant velocity, or deceleration.

On the contrary, in the embodiment, by selecting and using one of the aforementioned four trajectory generation patterns based on the result of the comparison between the output angular velocity $\omega_{rs}$ of the trajectory generator 6 at the point the change has occurred and the angular velocity $\omega_d$, deceleration before reaching the old target angle and acceleration at the start time of transition to the new target angle in the related arts are not required. It is possible to reach the target angle using three steps of acceleration, constant velocity and deceleration (or four steps if stop is further included) or two steps of constant velocity and deceleration based on the trajectory generation pattern selected depending on the condition at the point the change has occurred even if the change from the old angle to the new angle has occurred in the process of tracking by the old velocity profile. Consequently, it is possible to reach the target angle in a shorter time than in the related art.

In the related art, there is a technique that refers to a guidance law of missiles (a pure tracking navigation or a proportional navigation) such as Japanese Unexamined Patent Application Publication No. 2001-330656 "Direction detector for moving body and method for removal of disturbance therein". According to the guidance law of missiles, the trajectory is generated from an initial velocity of a missile to the target. However, it is impossible to arbitrarily set the target velocity of the missile which is tracking the trajectory. Additionally, since the formula of the guidance law of missiles is complicated, it is difficult to combine with another technique and change it so that the target velocity of the missile can be arbitrarily set.

On the contrary, in the embodiment, since it is possible to regenerate the changed trajectory without the discontinuity based on the current angle, the changed target angel and the target angular velocity even if the target angle or the target angular velocity is changed before the control target 1 reaches the target angle, when the embodiment is applied to the missile, it is possible not only to arbitrarily set the target velocity of the missile which is tracking the trajectory but also to generate the trajectory from the initial velocity of the missile to the target velocity continuously, and thus to reduce the deviation of the missile from the trajectory.

Industrial Applicability

The intended field of the present invention is not limited to the field of flying object such as satellites or aircraft, and it may be any mobile object field, including surface movement objects and water surface movement objects. It is possible to apply to the field which needs to generate the trajectory of the control target which tracks the target with such a movement.

Hereinbefore, configurations of the preferred embodiments of the present invention have been explained. However, note that such embodiments are mere exemplifications of the present invention, and do not limit the present invention at all. Those skilled in the art can easily understand that various modifications and changes can be made according to a particular application without departing from the gist of the present invention.

This application is based upon and claims the benefit of priority from Japanese patent application No. 2012-163669, filed on Jul. 24, 2012, the disclosure of which is incorporated herein in its entirety by reference.

REFERENCE SIGNS LIST 1 control target
2 angle detector
3 controller
4 driver
5 command generator
6 trajectory generator
11 control target 12 angle detector
13 controller
14 driver
15 command generator
16 trajectory generator
A target angle
A1 accelerating period
A3 initial decelerating period
A4 accelerating period
A11 accelerating period
B target angle
C initial angle
D1 decelerating period
D2 decelerating period
D3 constant velocity period
D4 constant velocity period
D11 constant velocity period
E1 constant velocity period
E2 constant velocity period
E3 constant velocity period
E4 constant velocity period
E11 constant velocity period
F1 period after completion
F2 period after completion
F3 period after completion
F4 period after completion
F11 period after completion
11 bold solid line
12 dashed line
13 bold solid line
14 dashed line
$O_1$ trajectory
$O_2$ trajectory
$O_3$ trajectory
$O_4$ trajectory
$O_5$ trajectory
S4 stop period
$t_\alpha$ acceleration duration time

What is claimed is:

1. A trajectory generation device comprising at least:
a control target,
an angle detection unit that outputs a current angle of the control target, a command generation unit that sets a target angle and
a target angular velocity of the control target, a trajectory generation unit that generates and outputs an output angular velocity and an output angle which give a trajectory of the control target based on the current angle, the target angle and the target angular velocity, wherein
if a change is generated from a current target angle to a new target angle or if a change is generated from the current target angular velocity to a new target angular velocity in the command generation unit,
a changed trajectory is regenerated by the trajectory generation unit based on the angle up to the new target angle or the angular velocity up to the new target angular velocity, on the basis of the output angular velocity generated by the trajectory generation unit at the point the change has occurred and on the basis of a current angle at the point the change has occurred or an output angle generated by the trajectory generation unit at the point the change has occurred.

2. The trajectory generation device according to claim 1, wherein the changed trajectory regenerated by the trajectory generation unit is taken as the trajectory which satisfies the target angular velocity or the new target angular velocity set by the command generation unit at a constant velocity.

3. The trajectory generation device according to claim 1, wherein the trajectory generation unit further comprises a comparison unit that compares the output angular velocity with the target angular velocity at the point the change has occurred, selects and sets any one of previously prepared trajectory generation patterns regarding the changed trajectory based on a result of a comparison made by the comparison unit as the changed trajectory regenerated by the trajectory generation unit.

4. The trajectory generation device according to claim 3, wherein, as the trajectory pattern according to the changed trajectory selected and set in accordance with the result of the comparison made by the comparison unit,
when the target angular velocity at the point the change has occurred is larger than the output angular velocity, a pattern which generates the trajectory from acceleration is selected and set,
when the target angular velocity at the point the change has occurred is equal to the output angular velocity, a pattern which generates the trajectory from constant velocity is selected and set,
when a sign of the target angular velocity at the point the change has occurred is equal to that of the output angular velocity, a pattern which generates the trajectory from deceleration is selected and set,
when none of above cases applies, a pattern which generates the trajectory from stop is selected and set.

5. A trajectory generation method comprising at least:
an angle detection step for outputting a current angle of the control target,
a command generation step for setting a target angle and a target angular velocity of the control target, and
a trajectory generation step for generating and outputting an output angular velocity and an output angle which give a trajectory of the control target based on the current angle, the target angle and the target angular velocity, wherein
if a change is generated from a current target angle to a new target angle or if a change is generated from the current target angular velocity to a new target angular velocity in the command generation step,
a changed trajectory is regenerated by the trajectory generation step based on the angle up to the new target angle or the angular velocity up to the new target angular velocity, on the basis of the output angular velocity generated by the trajectory generation step at the point the change has occurred and on the basis of a current angle at the point the change has occurred or an output angle generated by the trajectory generation step at the point the change has occurred.

6. The trajectory generation method according to claim 5, wherein the changed trajectory regenerated by the trajectory generation step is taken as the trajectory which satisfies the target angular velocity or the new target angular velocity set by the command generation step at a constant velocity.

7. The trajectory generation method according to claim 5, wherein the trajectory generation step further comprises a comparison step for comparing the output angular velocity with the target angular velocity at the point the change has occurred, selects and sets any one of previously prepared trajectory generation patterns regarding the changed trajectory based on a comparison result of the comparison step as the changed trajectory regenerated by the trajectory generation step.

8. The trajectory generation method according to claim 7, wherein, as the trajectory pattern according to the changed trajectory selected and set by the comparison result of the comparison step, when the target angular velocity at the point the change has occurred is larger than the output angular velocity, a pattern which generates the trajectory from acceleration is selected and set, when the target angular velocity at the point the change has occurred is equal to the output angular velocity, a pattern which generates the trajectory from constant velocity is selected and set, when a sign of the target angular velocity at the point the change has occurred is equal to that of the output angular velocity, a pattern which generates the trajectory from deceleration is selected and set, when none of above cases applies, a pattern which generates the trajectory from stop is selected and set.

9. A medium storing a trajectory generation program which performs the trajectory generation method according to any one of claim 5 as a program capable of being executed by a computer.

\* \* \* \* \*